March 1, 1960  M. O. FIXEN  2,926,425
MAP METER
Filed Dec. 15, 1954
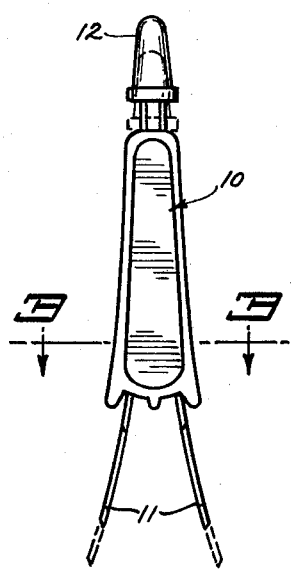
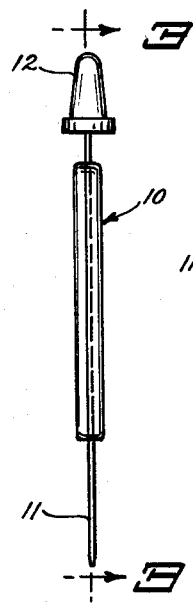
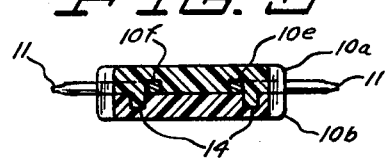
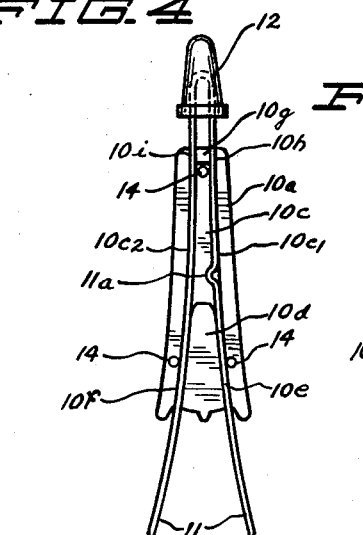
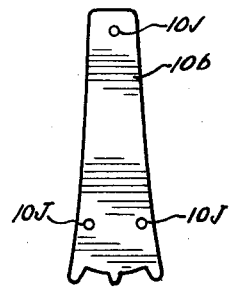
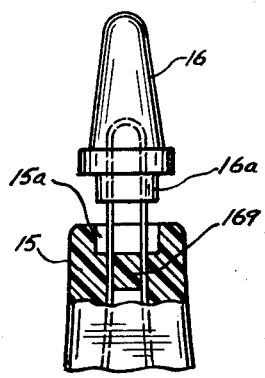
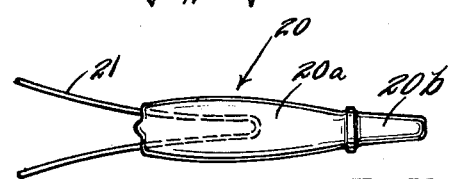
INVENTOR.
MARTIN O. FIXEN
BY
Chas. E. Reif
ATTORNEY

United States Patent Office 2,926,425
Patented Mar. 1, 1960

2,926,425
MAP METER
Martin O. Fixen, Minneapolis, Minn.

Application December 15, 1954, Serial No. 475,410

2 Claims. (Cl. 33—143)

This invention relates to a map-scanning device, and is particularly designed for use with road maps. Maps, including road maps, are made using many different scales. Such maps usually have the scale marked thereon. This is usually done by having a line which is graduated and shows the parts thereof, each representing so many miles on the map. People traveling by automobile now use road maps and these are often consulted to see the distance between certain places, especially when the persons are traveling between said places. While the distance between places which are quite far apart are noted on the map, they are noted in small increments, which increments represent the distance between adjacent towns or cities. It is desirable therefore to have some means or instrument by which the distances between selected towns and cities can be very easily obtained.

It is an object of this invention therefore to provide an instrument by means of which the distances between certain places on a map can be very quickly ascertained or computed.

It is another object of the invention to provide a device having spaced tines, the distance between which can be quickly varied so that the tines can be spaced according to the scale of the map, and then stepped across the desired distance on the map to show the distance between two points.

It is more specifically an object of the invention to provide such a device comprising a casing, a pair of members disposed in said casing, said members being preferably resilient and of small transverse dimension, said casing having grooves therein in which portions of said members are disposed and by which they are guided, together with a handle for moving said members longitudinally of said casing so that projecting tines can be spaced different distances apart.

These and other objects and advantages of the invention will be fully set forth in the following description made in connection with the accompanying drawings in which like reference characters refer to similar parts throughout the several views and in which:

Fig. 1 is a view in front elevation of the device, some of the parts being indicated in different positions by dotted lines;

Fig. 2 is a view in side elevation of said device;

Fig. 3 is a horizontal section taken on line 3—3 of Fig. 1 and shown on an enlarged scale; as indicated by the arrows;

Fig. 4 is a view in front elevation of the device, with one part of the casing thereof removed;

Fig. 5 is a view in front elevation of one part of the casing used;

Fig. 6 is a partial view partly in front elevation and partly in vertical section showing a modification; and Fig. 7 is a plan view with a portion in dotted line showing a modification.

Referring to the drawings, a device is shown comprising a casing 10. While this casing may be variously formed, in the embodiment of the invention illustrated it is shown as being tapered in front elevation from its lower end to its upper end. Said casing is preferably made of two parts 10a and 10b. Casing 10 is of narrow width, as shown in Fig. 2, so that parts 10a and 10b are of flat formation. The part 10a is formed with a recess 10c therein having spaced walls 10c1 and 10c2. Said recess and said walls converge toward the upper end of said casing. Part 10a has a portion 10d at its lower portion which forms with the walls 10c1 and 10c2 a pair of grooves 10e and 10f. As shown in Fig. 4, said walls 10c1 and 10c2 and said grooves 10e and 10f diverge toward the lower end of casing 10. A portion 10g adjacent the top of said casing is disposed between walls 10c1 and 10c2 and it also forms a pair of short grooves 10h and 10i. A pair of members 11 are provided and are disposed in the recess 10c and in the grooves 10e, 10f, 10h and 10i. Members 11 are of small cross sectional dimension and are thus slender in structure. Members 11 are comparatively stiff but are preferably resilient. A handle member 12 is secured to the upper ends of members 11. Members 11 could be separated at their upper ends or could be connected, as shown in Fig. 6. Said upper ends of members 11 are firmly secured in the handle member 12. One part of casing 10, such as part 10a, has a plurality of pins or cylindrical projections 14 upstanding therefrom. The other part 10b has a plurality of holes 10j formed therein spaced so as to have the pins 14 extend therethrough. One of the members 11 is provided with a stop portion 11a, and while this could be variously made, in the embodiment of the invention illustrated, it is shown as a hump formed on said member. The ends of members 11 at the lower part of the casing are formed as points so as to be somewhat sharp.

In assembling the device, the members 11 with the handle 12 secured thereto are placed in position, as shown in Fig. 4, the same being disposed in recess 10c and in the slots 10e and 10f. Part 10b is then placed over part 10a with pins 14 extending through the openings 10j. Parts 10a and 10b are then secured firmly together by a suitable adhesive. The same could be fused together when made of suitable material. While various materials could be used, in practice casing 10 has been made of plastic. Members 11 preferably have their diverging ends pointed.

In operation, the parts 11 will be moved by moving handle 12. It will be seen that as the members 11 are moved downwardly the ends thereof will diverge, said members 11 being guided in the grooves 10e and 10f. The ends of members 11 will be spaced so that they fit on the line indicating a scale of the map and will be separated a distance indicating a certain number of miles, such as ten or twenty. The operator will then place the end of one of the members 11 on the representation of one town or city and the device will then be oscillated successively about 180 degrees and stepped along the route between another town or city. The distance between the two places can thus be easily and quickly determined. The stop portion 11a will engage the pin 14 when it is moved upwardly and will engage the end of portion 10d when moved downwardly. The movement of the members 11 in both directions will thus be limited.

In Fig. 6 a slight modification is shown in which a recess 15a is made in the top of casing 15 which will be of the same general form as casing 10. Handle portion 16 corresponding to handle portion 12 will have a projection 16a at its bottom adapted to substantially fit in the recess 15a. Portion 16g will correspond to portion 10g shown in Fig. 4. Otherwise the device shown in Fig. 6 will be just the same as that shown in the other figures.

The device can be used as a spark plug tester of the spark plugs of an automotive vehicle. With the form shown in Figs. 1 to 5, the operator is very apt to get a shock by touching members 11. When the portion 16a is moved into recess 15a, there are no parts exposed from which the operator could get a shock.

In Fig. 7 a modification is shown in which a member 20 is shown comprising a main body portion 20a and a handle portion 20b. Said device is divided centrally in a plane parallel to the plane of the drawing as described in regard to member 10. The parts of member 20 are provided with grooves for receiving a portion of a substantially U-shaped member 21. Member 21 is similar to member 11, the same being of small transverse dimension, preferably resilient and having pointed ends. Member 21 will be placed between the parts of member 20 and said parts then firmly connected by a suitable adhesive or by fusing. Member 21 is held stationary in member 20.

In use the ends of member 21 will be placed on the map scale indication. The number of miles indicated between the points of member 21 will be noted. The device can now be stepped along the route between two locations on the map and the distance between said locations quickly computed.

From the above description it will be seen that I have provided a very simple and very convenient and useful device for scanning distances on a map and determining the mileage of such distances. The device is small and easily carried and it will save much time and effort in determining the distances on maps, particularly the road maps which are now commonly used by people traveling in automobiles. The device will have a high degree of utility for the purpose intended.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A map-scanning device having in combination, a casing, a pair of rather stiff slender members disposed in said casing, said casing having a pair of spaced grooves therein diverging toward one end of said casing, said members being disposed in said grooves and guided therein, said members projecting at said end of said casing and having said projecting ends pointed, said members also projecting at the other end of said casing, a handle member secured to the ends of said members at said other end of said casing, said casing being formed of two substantially flat portions, said grooves being in one of said portions, said portions having inter-engaging parts thereon for holding the same in proper alinement, and means for securing said portions together.

2. A map-scanning device having in combination, a casing diverging toward one end thereof having a raised central portion at its wider end forming spaced grooves therein, slender resilient members in longitudinally spaced relation disposed and guided in said grooves, said members projecting divergently at said end of said casing and also projecting at the other end of said casing, a handle secured to said members at said other end of said casing for holding said members in fixed relation and for moving said members, one of said members having an offset portion formed therein, adapted to engage the adjacent end of said raised portion, and a stop member at the other end of said casing whereby said offset portion is adapted to limit the longitudinal movement of said resilient members.

References Cited in the file of this patent

UNITED STATES PATENTS

| | | |
|---|---|---|
| 1,426,878 | Koebke | Aug. 22, 1922 |
| 1,842,051 | Renzelberg | Jan. 19, 1932 |
| 2,114,695 | Anderson | Apr. 19, 1938 |
| 2,137,710 | Anderson | Nov. 22, 1938 |
| 2,185,443 | Kreutz | Jan. 2, 1940 |
| 2,480,725 | Gilbert | Aug. 30, 1949 |
| 2,502,860 | Leithiser | Apr. 4, 1950 |

FOREIGN PATENTS

| | | |
|---|---|---|
| 737,087 | France | Sept. 27, 1932 |
| 835,389 | France | Sept. 19, 1938 |
| 986,323 | France | Mar. 21, 1951 |